United States Patent
Qi et al.

(10) Patent No.: US 11,831,029 B2
(45) Date of Patent: Nov. 28, 2023

(54) BATTERY AND BATTERY MANUFACTURING METHOD

(71) Applicants: CALB Co., Ltd., Jiangsu (CN); CALB Technology Co., Ltd., Jiangsu (CN)

(72) Inventors: Binwei Qi, Luoyang (CN); Yongjie Zhang, Luoyang (CN); Ci Zhang, Changzhou (CN)

(73) Assignees: CALB Co., Ltd., Jiangsu (CN); CALB Technology Co., Ltd., Jiangsu (CN)

( * ) Notice: Subject to any disclaimer, the term of this patent is extended or adjusted under 35 U.S.C. 154(b) by 54 days.

(21) Appl. No.: 17/158,013

(22) Filed: Jan. 26, 2021

(65) Prior Publication Data
US 2021/0359363 A1 Nov. 18, 2021

(30) Foreign Application Priority Data

May 14, 2020 (CN) .......................... 202010408393.5
Nov. 19, 2020 (CN) .......................... 202011301354.1

(51) Int. Cl.
*H01M 50/169* (2021.01)
*H01M 50/533* (2021.01)
(Continued)

(52) U.S. Cl.
CPC ......... *H01M 50/169* (2021.01); *H01M 50/15* (2021.01); *H01M 50/533* (2021.01); *H01M 50/536* (2021.01); *H01M 50/538* (2021.01)

(58) Field of Classification Search
CPC . H01M 50/10–103; H01M 50/147–15; H01M 50/166–169; H01M 50/40–403;
(Continued)

(56) References Cited

U.S. PATENT DOCUMENTS

2013/0149598 A1* 6/2013 Kim ...................... H01M 50/20
429/178
2013/0330593 A1* 12/2013 Kim .................. H01M 10/0431
429/179
(Continued)

FOREIGN PATENT DOCUMENTS

CN 106475675 3/2017
CN 106624361 5/2017
(Continued)

OTHER PUBLICATIONS

Machine translation of Kurita, JP-2018200841-A. Originally available Dec. 20, 2018. (Year: 2018).*
(Continued)

*Primary Examiner* — Jonathan Crepeau
*Assistant Examiner* — Jacob Buchanan
(74) *Attorney, Agent, or Firm* — JCIP GLOBAL INC.

(57) ABSTRACT

A battery and a battery manufacturing method are provided. The battery includes a main body portion, a cover plate assembly, a tab portion, and a connecting piece. The cover plate assembly is located on a top surface of the main body portion and includes a pole. The tab portion extends out from a side surface of the main body portion and is bent toward a first large surface of two opposite large surfaces of the main body portion. The connecting piece is bent into a first section, located on the top surface and connected with the pole, and a second section, parallel or almost parallel to the side surface and welded to a surface of one side of the tab portion facing or facing away from the main body portion. A surface where the connecting piece is connected with the second section is disposed opposite to the main body portion.

6 Claims, 9 Drawing Sheets

(51) Int. Cl.
*H01M 50/15* (2021.01)
*H01M 50/536* (2021.01)
*H01M 50/538* (2021.01)

(58) Field of Classification Search
CPC ..... H01M 50/463; H01M 50/471–486; H01M 50/50; H01M 50/531–54; H01M 10/04–0409; H01M 10/0422; H01M 10/0431; H01M 10/0445–0468; H01M 10/0481; H01M 10/049; H01M 10/058–0587; H01M 10/28–286; H01M 10/288

See application file for complete search history.

(56) References Cited

U.S. PATENT DOCUMENTS

| | | | | |
|---|---|---|---|---|
| 2014/0017521 A1* | 1/2014 | Suzuki | ............ | H01M 10/4257 429/7 |
| 2015/0364727 A1* | 12/2015 | Kim | ............ | H01M 50/55 429/185 |
| 2016/0126583 A1* | 5/2016 | Kato | ............ | H01M 10/0413 429/185 |
| 2019/0109348 A1* | 4/2019 | Yamamoto | ............ | H01M 10/0585 |
| 2019/0214670 A1* | 7/2019 | Kim | ............ | H01M 50/103 |
| 2019/0221820 A1* | 7/2019 | Guo | ............ | H01M 50/531 |
| 2020/0144583 A1* | 5/2020 | Kurita | ............ | H01M 50/533 |

FOREIGN PATENT DOCUMENTS

| | | | | |
|---|---|---|---|---|
| CN | 206250267 | | 6/2017 | |
| CN | 208819970 | | 5/2019 | |
| CN | 111446408 | | 7/2020 | |
| CN | 112201909 | | 1/2021 | |
| JP | 2017050069 | | 3/2017 | |
| JP | 2018200841 A | * | 12/2018 | ............ Y02E 60/10 |
| JP | 2019145271 | | 8/2019 | |
| WO | WO-2018235428 A1 | * | 12/2018 | ............ H01M 50/54 |
| WO | 2019088053 | | 5/2019 | |

OTHER PUBLICATIONS

"Partial Search Report of Europe Counterpart Application", dated Jul. 22, 2021, p. 1-p. 12.

"Search Report of Europe Counterpart Application", dated Oct. 19, 2021, p. 1-p. 10.

Office Action of China Counterpart Application, with English translation thereof, dated Jul. 1, 2022, pp. 1-25.

Office Action of China Counterpart Application, with English translation thereof, dated Mar. 3, 2023, pp. 1-24.

* cited by examiner

BATTERY AND BATTERY MANUFACTURING METHOD

CROSS-REFERENCE TO RELATED APPLICATION

This application claims the priority benefit of China patent application serial no. 202010408393.5, filed on May 14, 2020, and China patent application serial no. 202011301354.1, filed on Nov. 19, 2020. The entirety of each of the above-mentioned patent applications is hereby incorporated by reference herein and made a part of this specification.

BACKGROUND

Technical Field

The disclosure relates to the field of battery technology, and in particular to a battery and a battery manufacturing method.

Description of Related Art

In the prior art, the tabs of the battery are connected with the cover plate through the connecting portion. The connecting portion and the tabs are mostly welded. For the convenience of welding, the connecting portion with "1"-shaped cross section is often adopted, that is, the opposite connecting portion and tab are directly welded. At this time, the contact surface of the connecting portion and the tabs is in a perpendicular relationship with the main body portion of the battery. Since the connecting portion is very wide (>6 mm), the length size of two connecting portions are added to the original length size of the main body portion, so a lot of length space of the battery is occupied.

SUMMARY

According to the first aspect of the disclosure, a battery is provided, which includes a main body portion; a cover plate assembly, located on a top surface of the main body portion and including a pole; a tab portion, extending out from a side surface of the main body portion and bent toward a first large surface of two opposite large surfaces of the main body portion; and a connecting piece, bent into a first section and a second section. The first section is located on the top surface of the main body portion and is connected with the pole, and the second section is parallel to or almost parallel to the side surface of the main body portion and is welded onto a surface of one side of the tab portion facing or facing away from the side surface of the main body portion.

The battery of the embodiment of the disclosure includes a main body portion, a cover plate assembly, a tab portion, and a connecting piece. The tab portion on the main body portion is electrically connected with a pole on the cover plate assembly through the connecting piece. Since a second section is parallel to or almost parallel to a side surface of the main body portion, that is, a surface where the connecting piece is connected with the tab portion is disposed opposite to the main body portion, the maximum increase in size of the connecting piece toward a length direction of the main body portion is the thickness size of the connecting piece after connection is completed.

According to the second aspect of the disclosure, a battery manufacturing method is provided, which includes the following. In a bending step, a tab portion is bent toward a first large surface of two opposite large surfaces of a main body portion of a battery, so that a portion of the tab portion faces a side surface of the main body portion, and the tab portion extends out from the side surface of the main body portion. In a welding step, a second section of a connecting piece is disposed on a surface of one side of the tab portion facing or facing away from the side surface of the main body portion and is parallel to or almost parallel to the side surface of the main body. The tab portion and the second section of the connecting piece are welded. The connecting piece is a plate-shaped object bent into a first section and the second section. The first section is configured to be connected with a pole disposed on a top surface of the main body portion.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DETAILED DESCRIPTION OF DISCLOSED EMBODIMENTS

Figure 1:
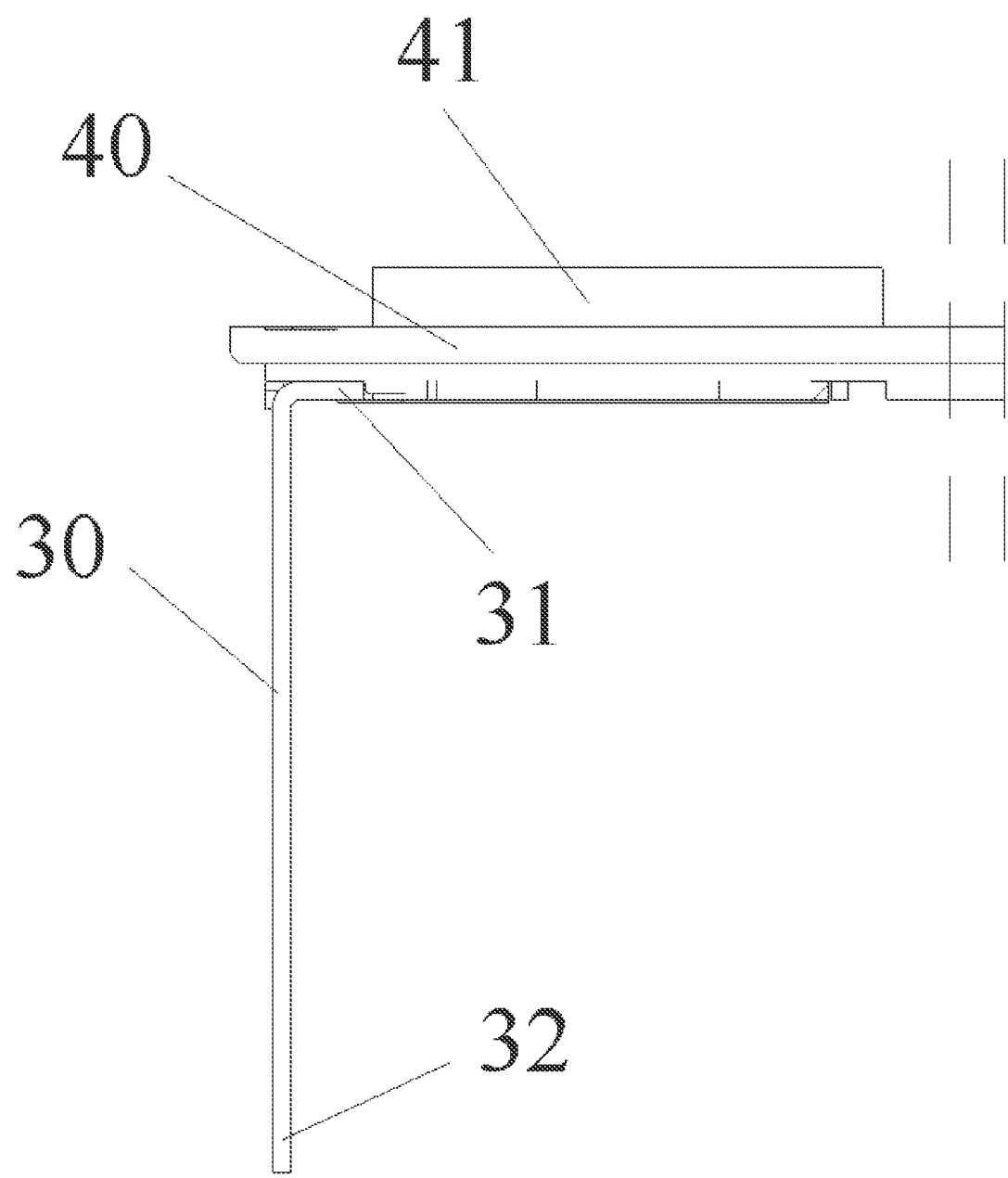
FIG. 1 is a partial structural diagram of a cover plate assembly and a connecting piece of a battery according to an exemplary embodiment.

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

The disclosure provides a battery and a battery manufacturing method, which aim to overcome at least one of the above-mentioned drawbacks of the prior art.

An embodiment of the disclosure provides a battery. Please refer to FIG. 1 to FIG. 12. The battery includes a main body portion 10; a cover plate assembly 40, located on a top surface of the main body portion 10 and including a pole 41; a tab portion 20, extending out from a side surface of the main body portion 10 and bent toward a first large surface of two opposite large surfaces of the main body portion 10; and a connecting piece 30, bent into a first section 31 and a second section 32. The first section 31 is located on the top surface of the main body portion 10 and is connected with the pole 41, and the second section 32 is parallel to or almost parallel to the side surface of the main body portion 10 and is welded onto a surface of one side the tab portion 20 facing or facing away from the side surface of the main body portion 10. If the main body portion 10 is approximated as a cuboid, the two large surfaces are the surfaces with the largest area among the six surfaces of the cuboid.

The battery of an embodiment of the disclosure includes a main body portion 10, a cover plate assembly 40, a tab portion 20, and a connecting piece 30. The tab portion 20 on the main body portion 10 is electrically connected with a pole 41 on the cover plate assembly 40 through the connecting piece 30. Since the second section 32 is parallel to or almost parallel to a side surface of the main body portion 10, that is, a surface where the connecting piece 30 is connected with the tab portion 20 is disposed opposite to the main body portion 10, the maximum increase in size of the connecting piece 30 toward a length direction of the main body portion 10 is the thickness size of the connecting piece 30 after connection is completed. Considering that the thickness size of the connecting piece 30 relative to the length size thereof is smaller, the amount of length space occupied by the battery is reduced.

In an embodiment, the tab portion 20 is a single tab 28 extending out from the side surface of the main body portion 10.

Figure 2:
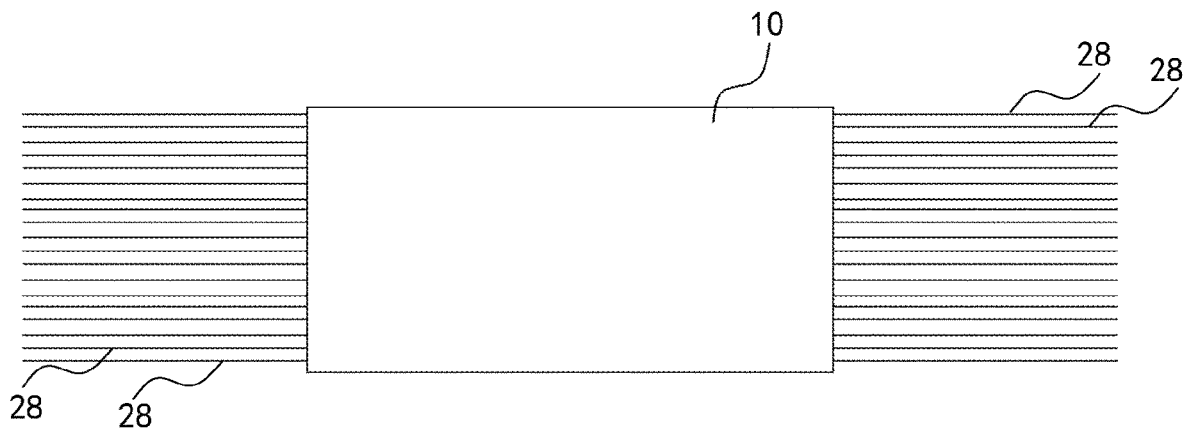
FIG. 2 is a structural diagram of a main body portion and a single tab of a battery according to an exemplary embodiment.

In an embodiment, the tab portion 20 includes two or more single tabs 28 extending out from the side surface of the main body portion 10. As shown in FIG. 2, the tab portion 20 includes more than two single tabs 28. The single tab 28 is a metal sheet, and multiple metal sheets are stacked to form the tab portion 20.

Figure 3:
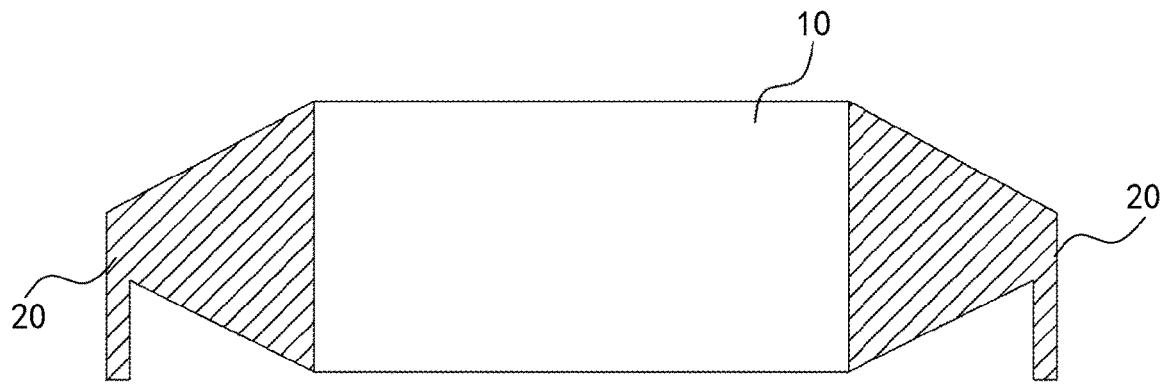
FIG. 3 is a structural diagram of an electrode assembly of a battery according to an exemplary embodiment.
Figure 4:
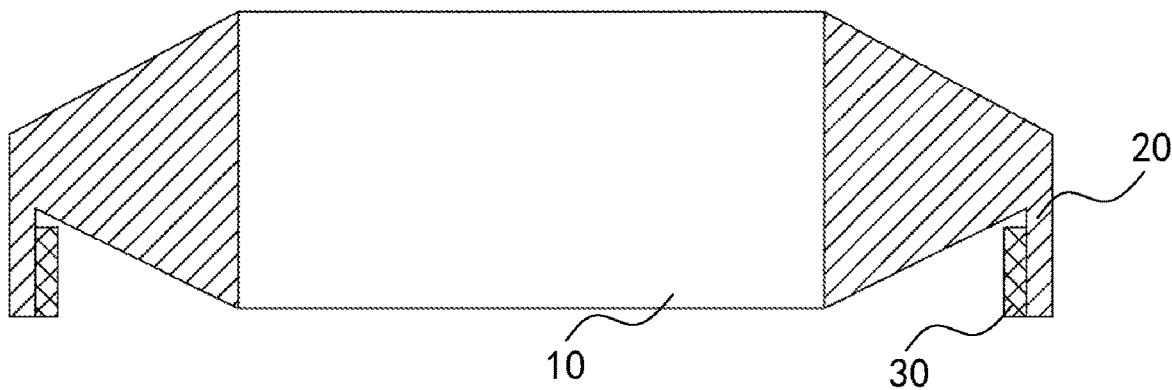
FIG. 4 is a structural diagram of a tab portion and a connecting piece of a battery according to an exemplary embodiment.
Figure 5:
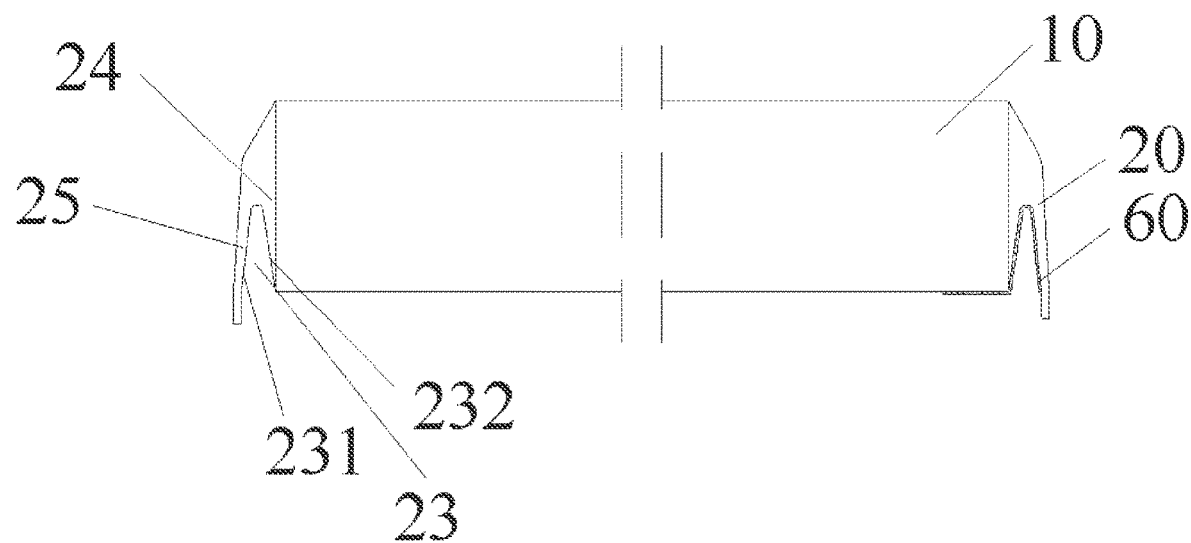
FIG. 5 is a structural diagram of an electrode assembly of a battery according to another exemplary embodiment.

It should be noted that multiple single tabs 28 in FIG. 2 are squeezed together and bent to form the structure shown in FIG. 3 and FIG. 5.

As shown in FIG. 3, the tab portion 20 is disposed opposite to the main body portion 10 after being bent. A free end of the tab portion 20 may not exceed the first large surface of the main body portion 10. The tab portion 20 and the connecting piece 30 are welded to form the structure shown in FIG. 4.

As shown in FIG. 5, a portion of the tab portion 20 after being bent is disposed opposite to the main body portion 10. The free end of the tab portion 20 exceeds the first large surface of the main body portion 10. The tab portion 20 and the connecting piece 30 are welded to form the structure shown in FIG. 7.

As shown in FIG. 1, the connecting piece 30 includes the first section 31 and the second section 32. The connecting piece 30 itself is a straight plate. The first section 31 and the second section 32 are formed through bending the connecting piece 30. At this time, the first section 31 is electrically connected with the pole 41 on the cover plate assembly 40. The second section 32 is configured to electrically connect the tab portion 20. It should be noted that the second section 32 and the tab portion 20 are directly welded.

In an embodiment, the connecting piece 30 is an L-shaped plate body, that is, the first section 31 and the second section 32 form an L-shaped plate body, that is, the first section 31 and the second section 32 are both separate straight plate bodies.

It should be noted that the second section 32 is parallel to or almost parallel to the side surface of the main body portion 10, that is, an included angle between the second section 32 and the side surface of the main body portion 10 may be 0°. Of course, the included angle between the second section 32 and the side surface of the main body portion 10 may be greater than 0°, which is subject to actual installation or positional changes during usage process. The included angle between the second section 32 and the side surface of the main body portion 10 may not have a relatively fixed angle, but the specific fluctuations will not be too big, and is roughly 0°. Within a preferable range, the included angle between the second section 32 and the side surface of the main body portion 10 is 0° to 10°.

In an embodiment, as shown in FIG. 1, the connecting piece 30 is L-shaped, and two ends of the connecting piece 30 are respectively connected with the tab portion 20 and the pole 41 of the cover plate assembly 40. The two ends of the connecting piece 30 respectively include the second section 32 and the first section 31. The second section 32 is connected with the tab portion 20. The first section 31 is connected with the pole 41. The structural configuration of the L-shaped connecting piece 30 not only facilitates the connection with the tab portion 20 and the pole 41, but also prevents the bending process of the connecting piece 30 and the tab portion 20. Also, the connection is stable and strong.

It should be noted that the second section 32 is a straight plate, so that after the second section 32 is connected with the tab portion 20, no bending or other processing is required. The second section 32 is disposed opposite to the main body portion 10 without any section body being perpendicular to the main body portion 10, which is different from that after connecting one side of an L plate or U-shaped plate to the tab portion 20, the L plate or U-shaped plate needs to be bent into a straight plate, and there may be the issue of unstable connection (such as crease or breakage) at where the L plate or U-shaped plate is bent. The second section 32 is a straight plate. The tab portion 20 is directly connected with the straight plate, which may further reduce the amount of length space occupied by the battery. The second section is a straight plate without bending, which further improves the stability of connection between the tab portion 20 and the straight plate, and improves the performance of the battery. In addition, the second section 32 is a solid straight plate with no penetrating slot or hole in the middle, which is different from disposing an elongated through hole in the middle for the tab portion 20 to extend out from the through hole. The solid straight plate further improves the stability of connection between the tab portion 20 and the straight plate, and the connection is strong without shaking or bending deformation when the tab portion 20 and the straight plate are welded, which may improve the production efficiency and the welding yield of the product.

In an embodiment, the main body portion 10 and the tab portion 20 form an electrode assembly. The tab portion 20 is connected with the main body portion 10. The tab portion 20 is disposed in a bendable manner, so that after the tab portion 20 is bent at a preset angle, a portion of the projection of the tab portion 20 toward the main body portion 10 is located outside the main body portion 10.

Specifically, the tab portion 20 is disposed in a bendable manner, and after bending, the projection of a partial section body of the tab portion 20 toward the main body portion 10 may be located outside the main body portion 10. Therefore, when connecting the tab portion 20 with the connecting piece 30, the partial section body located on the outside is disposed opposite to the connecting piece 30, and the free space between the portion and the main body portion 10 is used to place a structure such as a welding seat 50, so as to facilitate the implementation of the connection between the tab portion 20 and the connecting piece 30.

In an embodiment, as shown in FIG. 5, after the tab portion 20 is bent at a preset angle, the tab portion 20 has a shaping groove 23. The shaping groove 23 is formed after the tab portion 20 is bent, which not only facilitates the connection thereof with the connecting piece 30, but also reduces the amount of increase of the tab portion 20 after being bent toward the length direction of the main body portion 10.

As shown in FIG. 5, the shaping groove 23 includes a first side wall 231 and a second side wall 232 oppositely disposed. The first side wall 231 is located on one side of the shaping groove 23 away from the main body portion 10. The second side wall 232 is located on one side of the shaping groove 23 close to the main body portion 10. The width of the first side wall 231 is greater than the width of the second side wall 232.

In an embodiment, an insulating layer 60 is disposed in the shaping groove 23. The insulating layer 60 is configured to prevent electrical connection between the tab portion 20 and other parts.

In an embodiment, as shown in FIG. 5, the tab portion 20 includes a first area 24, extending out from the side surface of the main body portion 10; and a second area 25, extending out from the first area 24 and bent toward the first large surface of the main body portion 10. The connecting piece 30 is welded to the second field 25.

Specifically, the first area 24 and the main body portion 10 form fixed connection. The second area 25 is configured to implement the connection with the connecting piece 30, that is, to implement the relative configuration with the second section 32 of the connecting piece 30 after the tab portion 20 is bent to ensure the reliability of connection. The shaping groove 23 is formed between the first area 24 and the second area 25.

Figure 9:
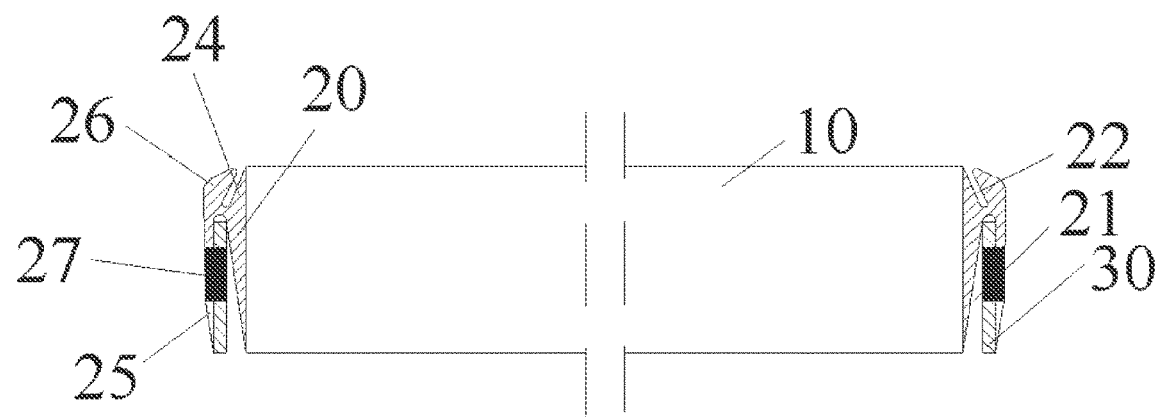
FIG. 9 is a partial structural diagram of a battery according to an exemplary embodiment.
Figure 11:
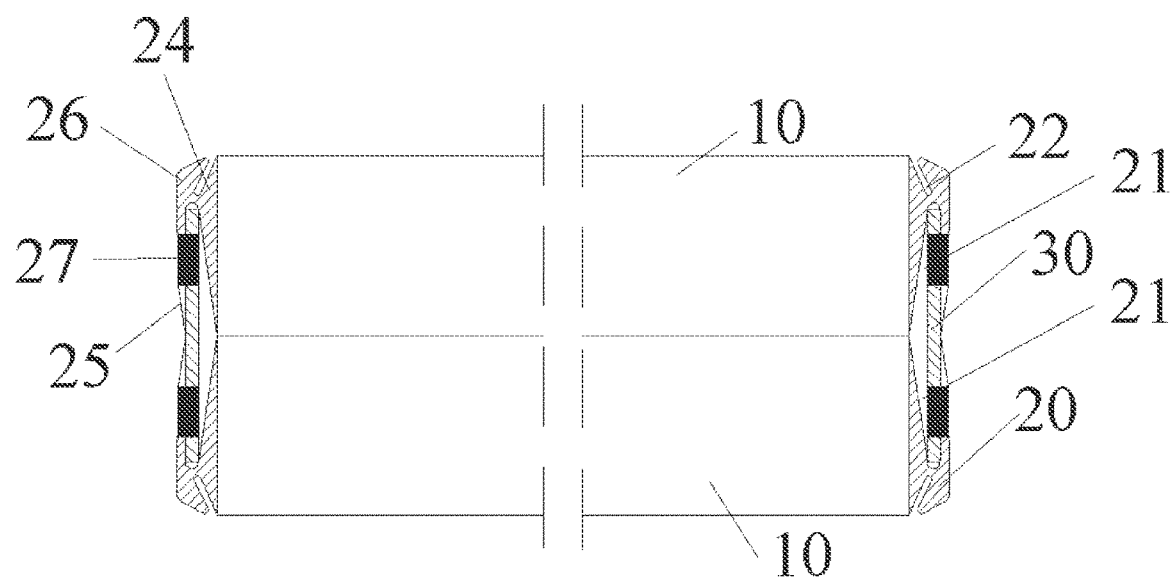
FIG. 11 is a partial structural diagram of a battery according to another exemplary embodiment.

In an embodiment, please refer to FIG. 9 and FIG. 11. The tab portion 20 includes the first area 24, the second area 25, and a stacked portion 26. The first area 24 is connected with the main body portion 10. The second area 25 is connected with the first area 24. The stacked portion 26 is disposed on the second area 25 and is close to one end of the second area 25 connected with the first area 24. The connecting piece 30 is connected with the second area 25. A surface where the connecting piece 30 is connected with the second area 25 is disposed opposite to the main body portion 10.

Specifically, the surface where the connecting piece 30 is connected with the tab portion 20 is disposed opposite to the main body portion 10, that is, when the connecting piece 30 is connected with the tab portion 20, the two are oppositely disposed to facilitate the connection. The maximum increase in size of the connecting piece 30 toward the length direction of the main body portion 10 is the thickness size of the connecting piece 30 after the connection is completed. Considering that the thickness size of the connecting piece 30 relative to the width size thereof is smaller, the issue of the connecting piece 30 occupying a relatively large length space is prevented.

In an embodiment, the tab portion 20 is composed of the first area 24, the second area 25, and the stacked portion 26. The first area 24 is connected with the main body portion 10. The second area 25 is connected with the connecting piece 30. The stacked portion 26 belongs to an additional section body formed after the tab portion 20 is shaped. The stacked portion 26 is disposed on the second area 25.

In an embodiment, the stacked portion 26 protrudes outward along the outer surface of the second area 25, that is, the stacked portion 26 formed during the shaping process is located outside the second area 25 and does not gather in the second area 25 to ensure that there is no excessive increase in size toward the length direction of the main body portion 10.

In an embodiment, the tab portion 20 is a bent body to form a recess portion 21. During the manufacturing process of the battery, the tab portion 20 is shaped, so that the tab portion 20 forms a depression 22. That is, since partial section bodies of the tab portion 20 superimpose due to the bending process, the recess portion 21 or the depression 22 is the contact surface of the two superimposed section bodies when two superimposed section bodies are in contact, and the recess portion 21 or the depression 22 is the groove formed by the two superimposed section bodies when the two superimposed section bodies are separated.

In an embodiment, there is the recess portion 21 between the second area 25 and the first area 24. An opening of the recess portion 21 is located on a first side of the main body portion 10. The connecting piece 30 is located inside or outside the recess portion 21. The recess portion 21 ensures that the tab portion 20 and the connecting piece 30 are oppositely disposed to facilitate the implementation of the connection between the two.

In an embodiment, the maximum increase in size of the connecting piece 30 toward the length direction of the main body portion 10 is the thickness size of the connecting piece 30. When the connecting piece 30 is located in the recess portion 21 of the tab portion 20, there may not be any increase in size toward the length direction of the main body portion 10.

In an embodiment, the increase in size of the tab portion 20 after being connected with the connecting piece 30 toward the length direction of the main body portion 10 is relatively smaller. Since the surface where the connecting piece 30 is connected with the tab portion 20 is disposed opposite to the main body portion 10, that is, a partial section body of the tab portion 20 is also disposed opposite to the main body portion 10, the width direction of the tab portion 20 does not extend along the length direction of the main body portion 10, but partially extends along the length direction (such as the first area 24), and partially extends inclined to the length direction (the extension may form the recess portion 21), so as to ensure that the tab portion 20 is disposed opposite to the main body portion 10. Therefore, the increase in size of the tab portion 20 toward the length direction of the main body portion 10 is relatively smaller.

In an embodiment, the surface where the second section 32 of the connecting piece 30 is connected with the tab portion 20 is disposed opposite to the main body portion 10. That is, the second section 32 of the connecting piece 30 and the main body portion 10 are not in a perpendicular relationship as the prior art, but are in a relationship of less than 90°, which may of course be a parallel relationship.

In an embodiment, in order to dispose the tab portion 20 opposite to the second section 32 of the connecting piece 30, the tab portion 20 is bent at a preset angle to form the shaping groove 23. After the tab portion 20 is connected with the connecting piece 30, secondary shaping is performed on the tab portion 20, so that the shaping groove 23 becomes the recess portion 21, as shown by the structure shown in FIG. 7 to FIG. 9.

In an embodiment, when the connecting piece 30 is located inside the recess portion 21, the connecting piece 30 does not increase in size toward the length direction of the main body portion 10. At the same time, the connecting piece 30 has a supporting effect on the tab portion 20, which may have a certain shaping effect on the tab portion 20.

In an embodiment, when the connecting piece 30 is located outside the recess portion 21, the increase in size of the connecting piece 30 toward the length direction of the main body portion 10 is the thickness size thereof.

Figure 12:
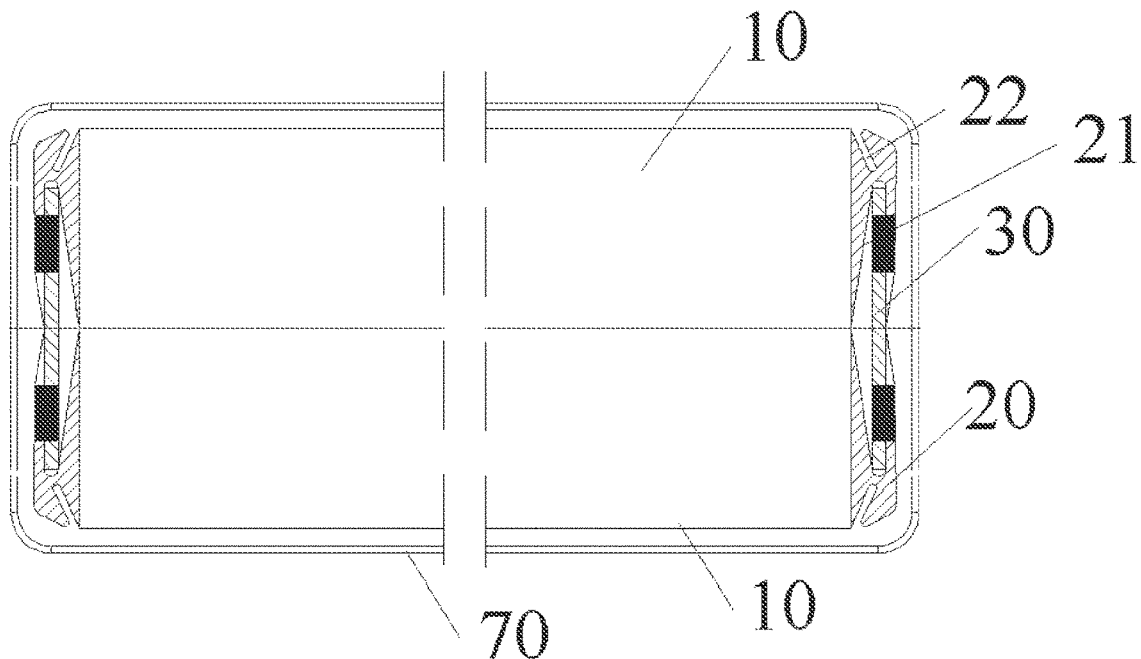
FIG. 12 is a structural diagram of an assembly of a battery with a box according to another exemplary embodiment.

In an embodiment, as shown in FIG. 12, the battery further includes a box 70, accommodating the main body portion 10, the tab portion 20, and the connecting piece 30. That is, the protection of the main body portion 10, the tab portion 20, and the connecting piece 30 is implemented.

It should be noted that the cover plate assembly 40 is located on the box 70.

In an embodiment, the tab portion 20 is accommodated in the box 70 after being stacked. The stacked portion is the portion between a welding mark 27 on the tab portion 20 and the side surface of the main body portion 10. That is, the tab portion 20 forms the stacked portion 26 after being stacked.

In an embodiment, the tab portion 20 includes two or more single tabs 28 extending out from the side surface of the main body portion 10. That is, multiple single tabs 28 are bent and stacked to form the tab portion 20. When the single tab 28 is flattened along the direction perpendicular to the side surface of the main body portion 10, the distance from one end of the welding mark on the single tab 28 close to the side surface of the main body portion 10 to the side surface of the main body portion 10 is greater than the distance from the single tab 28 to the first large surface. That is, referring to FIG. 5, it can be understood that after the tab portion 20 is bent to form the shaping groove 23, one end of the second area 25 exceeds the first large surface of the main body portion 10. As can be seen in conjunction with FIG. 6 and FIG. 7, the connecting piece 30 is connected with a portion of the tab portion 20 located below the main body portion 10, and the welding mark 27 is formed through welding.

Figure 7:
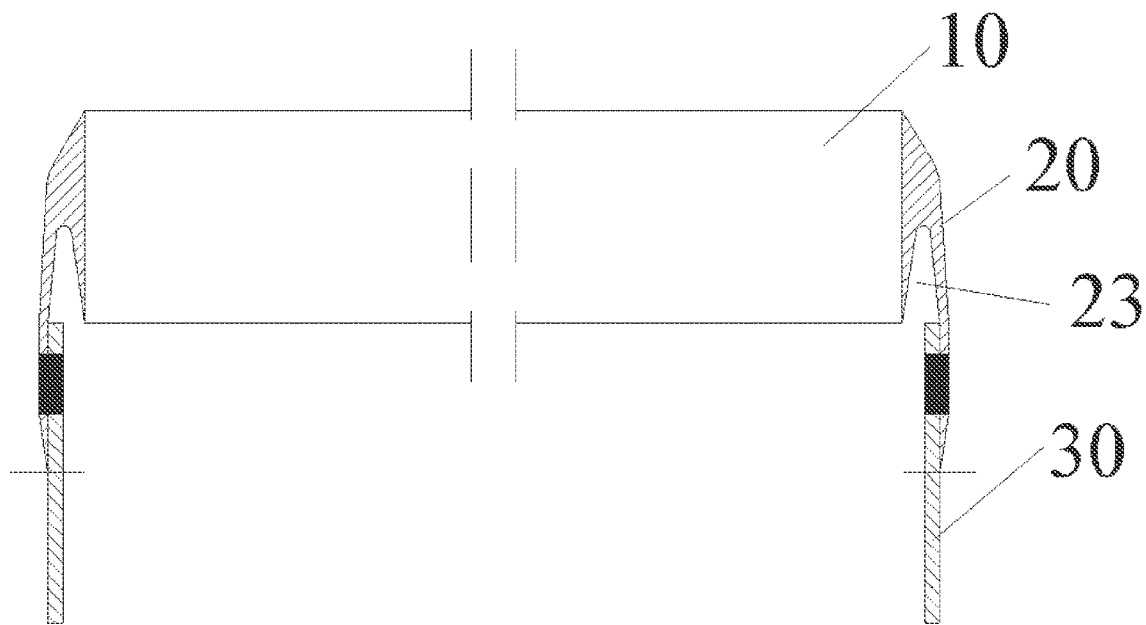
FIG. 7 is a structural diagram of another process of a battery manufacturing method according to an exemplary embodiment.
Figure 8:
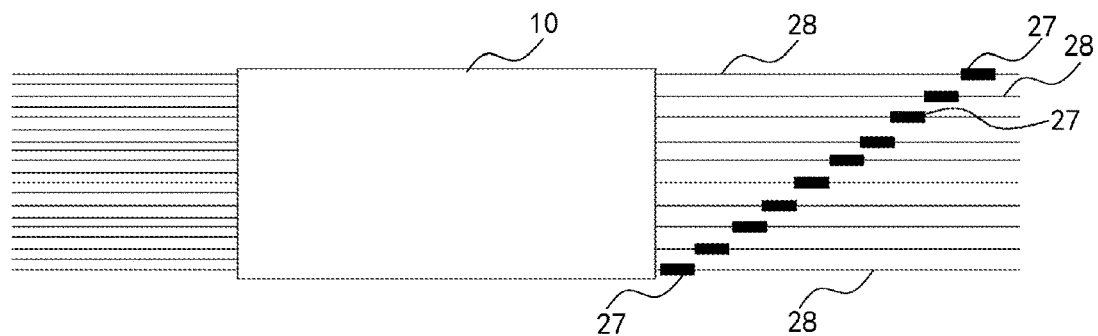
FIG. 8 is a structural diagram of a welding mark and a single tab of a battery according to an exemplary embodiment.

Specifically, FIG. 8 shows when the single tab 28 is flattened along the direction perpendicular to the side surface of the main body portion 10, which can be understood as straightening the tab portion 20 shown in FIG. 7. That is, multiple single tabs 28 are formed on the side surface of the main body portion 10, and the welding mark 27 is formed on each single tab 28. Since the contact surfaces of the multiple single tabs 28 will be misaligned after being bent, the welding mark 27 of each single tab 28 will appear as the arrangement shown in FIG. 8. Of course, during actual welding, when the single tab 28 is flattened along the direction perpendicular to the side surface of the main body portion 10, there may be cases where the projections of the welding marks 27 of some or all of the single tabs 28 partially or completely overlap in the thickness direction.

In an embodiment, as shown in FIG. 9 and FIG. 11, only one depression 22 is disposed on the surface of one side of the stacked portion of the tab portion 20 away from the first large surface. That is, the tab portion 20 only forms one stacked portion 26 after being stacked to ensure the stability of the tab portion 20. Only one depression is formed through shaping to prevent the tabs from being disorderly stacked, which simplifies the process while improving the consistency of the battery, thereby improving the performance of the battery.

In an embodiment, as shown in FIG. 9 and FIG. 11, the depression 22 is formed between the stacked portion 26 and the first area 24, and the opening of the depression 22 is located on the second side of the main body portion 10 away from the first side. The connecting piece 30 is located on one side of the tab portion 20 away from the opening of the depression 22. The formation of the depression 22 is mainly to reduce the amount of increase in the size of the tab portion 20 toward the thickness direction of the main body portion 10. That is, after the tab portion 20 is connected with the connecting piece 30, secondary shaping is performed on the tab portion 20, so that the tab portion 20 is bent and protrudes outwards, which increases the size of the main body portion 10 in the thickness direction. Therefore, the tab portion 20 is pressed along a direction close to the main body portion 10 to form a relatively smaller depression 22.

In an embodiment, the connecting piece 30 is located on one side of the tab portion 20 away from the opening of the depression 22. That is, one end of the connecting piece 30 is close to a bottom portion of the depression 22. The connecting piece 30 extends along a direction away from the bottom portion of the depression 22.

In an embodiment, the opening of the depression 22 is located on the first side of the main body portion 10, that is, the opening of the depression 22 and the opening of the recess portion 21 are located on the same side. The connecting piece 30 is located on one side of the tab portion 20 close to the opening of the depression 22. The formation of the depression 22 is mainly to reduce the amount of increase in the size of the tab portion 20 toward the thickness direction of the main body portion 10. That is, after the tab portion 20 is connected with the connecting piece 30, secondary shaping is performed on the tab portion 20, so that the tab portion 20 is bent and protrudes outwards. Therefore, the tab portion 20 is pressed along a direction away from the main body portion 10 to form a relatively smaller depression 22.

In an embodiment, as shown in FIG. 11 and FIG. 12, the main body portions 10 are disposed in pairs, and the respective first large surfaces are opposite. The two tab portions 20 respectively extending out from two side surfaces of the same side of two main body portions 10 are welded onto the second section 32 of the same connecting piece 30. That is, the two tab portions 20 of the two main body portions 10 share one connecting piece 30 to reduce the structure setting and reduce the cost while increasing the energy density of the battery.

In an embodiment, the connecting pieces 30 are disposed in pairs. The poles 41 on the cover plate assembly 40 are disposed in pairs. A pair of connecting pieces 30 are respectively connected with a pair of poles 41. The pair of connecting pieces 30 are respectively connected with the tab portions 20 at two ends of the main body portion 10. The tab portions 20 connected with the connecting piece 30 each includes the first area 24, the second area 25, and the stacked portion 26.

In an embodiment, the main body portions 10 are disposed in pairs. A pair of main body portions 10 are both connected with the tab portions 20. The connecting piece 30 connects two adjacent tab portions 20. The two main body portions 10 are oppositely connected. At this time, the two adjacent tab portions 20 share one connecting piece 30, or may, of course, be respectively connected with one connecting piece 30.

In an embodiment, as shown in FIG. 9, the main body portion 10, the cover plate assembly 40, the two tab portions 20 connected at two ends of the main body portion 10, and two connecting pieces 30 respectively connecting the two tab portions 20 constitute the battery. The tab portion 20 includes the recess portion 21 and the depression 22, and the connecting piece 30 is connected in the recess portion 21.

In an embodiment, the battery is composed of the main body portion 10, the two tabs 20 connected at two ends of the main body portion 10, and the two connecting pieces 30 respectively connecting the two tab portions 20. One tab portion 20 includes the recess portion 21 and the depression 22, and the connecting piece 30 is connected in the recess portion 21. The structure of the other tab portion 20 may adopt other forms as long as the other tab portion 20 is ensured to be connected with the connecting piece 30, which is not limited thereto.

In an embodiment, as shown in FIG. 11, the battery is composed of two main body portions 10, two pairs of tab portions 20 connected at two ends of the main body portions 10, and two connecting pieces 30 respectively connecting the two pairs of tab portions 20. The tab portion 20 includes the recess portion 21 and the depression 22, and the connecting piece 30 is connected in the recess portion 21. The recess portions 21 of two adjacent tab portions 20 are oppositely disposed to accommodate one connecting piece 30.

In an embodiment, the battery is composed of two main body portions 10, two pairs of tab portions 20 connected at two ends of the main body portions 10, and two connecting pieces 30 respectively connecting the two pairs of tab portions 20. A pair of tab portions 20 includes the recess portions 21 and the depressions 22, and the connecting pieces 30 are connected in the recess portions 21. The recess portions 21 of two adjacent tab portions 20 are oppositely disposed to accommodate one connecting piece 30. The structure of the other pair of tab portions 20 may adopt other forms, as long as the other pair of tab portions 20 is ensured to be connected with the connecting pieces 30, which is not limited thereto.

In an embodiment, the main body portion 10 may include more than two pole pieces 11. Each single tab 28 respectively extends out from the corresponding pole piece 11. The widths of the single tab 28 and the pole piece 11 are the same. That is, after the main body portion 10 and the tab portion 20 are formed, there is no need to cut the tab portion 20, thereby reducing the manufacturing process.

Figure 13:
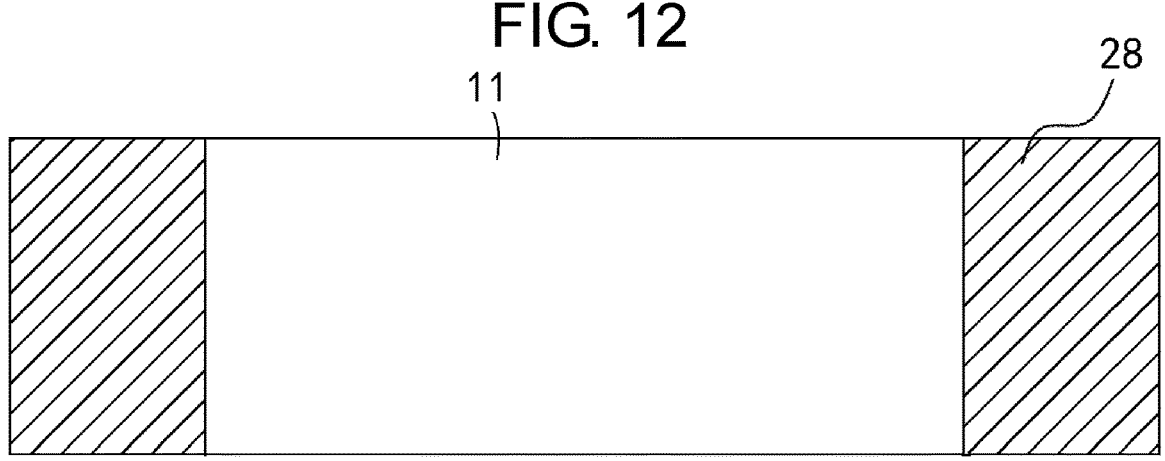
FIG. 13 is a structural diagram of a pole piece and a single tab of a battery according to an exemplary embodiment.

Specifically, as shown in FIG. 13, the widths of the single tab 28 and the pole piece 11 are the same. That is, after the main body portion 10 is formed by winding or lamination of the pole piece 11, multiple single tabs 28 located on the main body portion 10 do not need to be cut.

Figure 14:
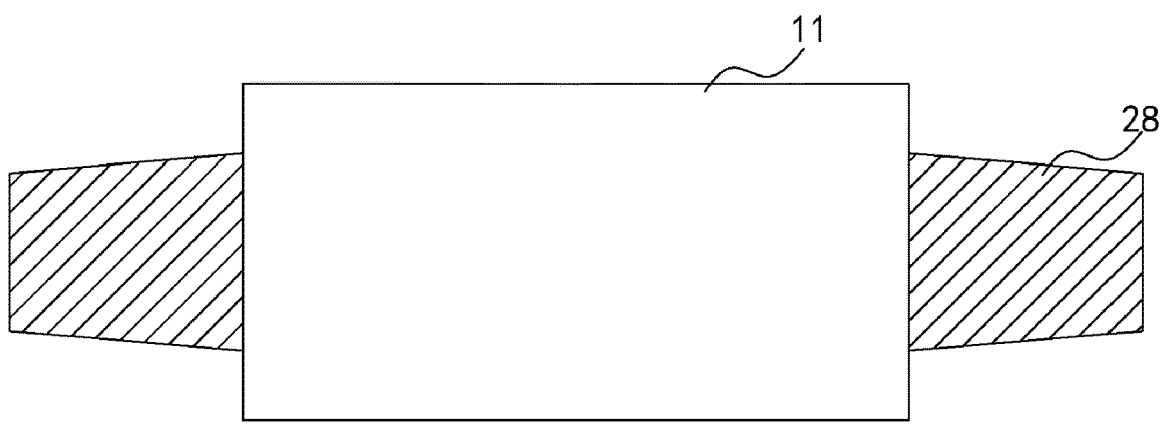
FIG. 14 is a structural diagram of a pole piece and a single tab of a battery according to another exemplary embodiment.

In some embodiments, the main body portion 10 may include more than two pole pieces 11. Each single tab 28 extends out from the corresponding pole piece 11. The widths of the single tab 28 and the pole piece 11 are not the same. As shown in FIG. 14, the width of the single tab 28 is less than the width of the pole piece 11. That is, the single tab 28 is cut (during the winding or lamination to form the main body portion 10).

An embodiment of the disclosure also provides a battery manufacturing method, which includes the following. In a bending step, a tab portion 20 is bent toward a first large surface of two opposite large surfaces of a main body portion 10 of a battery, so that a portion of the tab portion 20 faces a side surface of the main body portion 10. The tab portion 20 includes two or more single tabs 28 extending out from the side surface of the main body portion 10. In a welding step, a second section 32 of a connecting piece 30 is disposed on a surface of one side of the tab portion 20 facing or facing away from the side surface of the main body portion 10 and is parallel to or almost parallel to the side surface of the main body 10. The tab portion 20 and the second section 32 of the connecting piece 30 are welded. The connecting piece 30 is a plate-shaped object bent into a first section 31 and the second section 32. The first section 31 is configured to be connected with a pole 41 disposed on a top surface of the main body portion 10.

In the battery manufacturing method of an embodiment of the disclosure, the bent tab portion 20 is connected with the connecting piece 30, which facilitates the implementation of the connection between the two. Also, the maximum increase in size of the connecting piece 30 toward the length direction of the main body portion 10 is the thickness size of the connecting piece 30 after the connection is completed. Considering that the thickness size of the connecting piece 30 relative to the length size thereof is smaller, the issue of the connecting piece 30 occupying a relatively large length space is prevented. At the same time, the welded tab and connecting piece do not need to be bent again, which simplifies the process and improves the stability of the connection between the tab and the connecting piece.

In an embodiment, the battery manufacturing method further includes a shaping step. In the bending step, a portion of the tab portion 20 exceeds the first large surface in the width direction of the main body portion 10. In the welding step, welding is implemented on the portion of the tab portion 20 that exceeds the first large surface. In the shaping step, a portion between the welding mark of the tab portion 20 and the side surface of the main body portion 10 is stacked to reduce the size of the tab portion 20 along the width and/or height direction of the main body portion.

Specifically, the battery manufacturing method sequentially goes through the bending step, the welding step, and the shaping step. After the tab portion 20 is bent, a portion of the projection of the tab portion 20 toward the main body portion 10 is located outside the main body portion 10 to be connected with the connecting piece 30. The width of the tab portion 20 is larger, so after the tab portion 20 is bent, a partial section body will exceed the plane of one side of the main body portion 10. That is, the tab portion 20 forms a larger reserved space with the main body portion 10, as shown by the lower side of the main body portion 10 in FIG. 5.

In an embodiment, in the welding step, a supporting plate 112 for welding is disposed to support the second section 32 of the connecting piece 30 and the portion of the tab portion 20 that exceeds the first large surface. The welding is performed from a direction toward the side surface of the main body portion 10. The supporting plate 112 is closer to the side surface of the main body portion 10 than the second section 32 of the connecting piece 30 and the portion of the tab portion 20 facing the side surface of the main body portion 10. That is, the connecting piece 30 is located under the main body portion 10 for welding. At this time, the connecting piece 30 and the side surface of the main body portion 10 are not directly opposite. The supporting plate 112 can ensure stable support for the second section 32 and the tab portion 20.

Specifically, the supporting plate 112 may be a welding seat 50. In the welding step, the welding seat 50 is placed on one side of the main body portion 10. The tab portion 20 and the connecting piece 30 are both disposed opposite to the welding seat 50. The tab portion 20 and the connecting piece 30 are welded. After the tab portion 20 are the connecting piece 30 are welded, the connecting piece 30 is moved toward one side close to the main body portion 10. That is, the shaping step is performed.

In an embodiment when the welding seat 50 is adopted for support, the battery manufacturing method includes the following.

As shown in FIG. 5, the tab portion 20 is bent to form a shaping groove 23.

Figure 6:
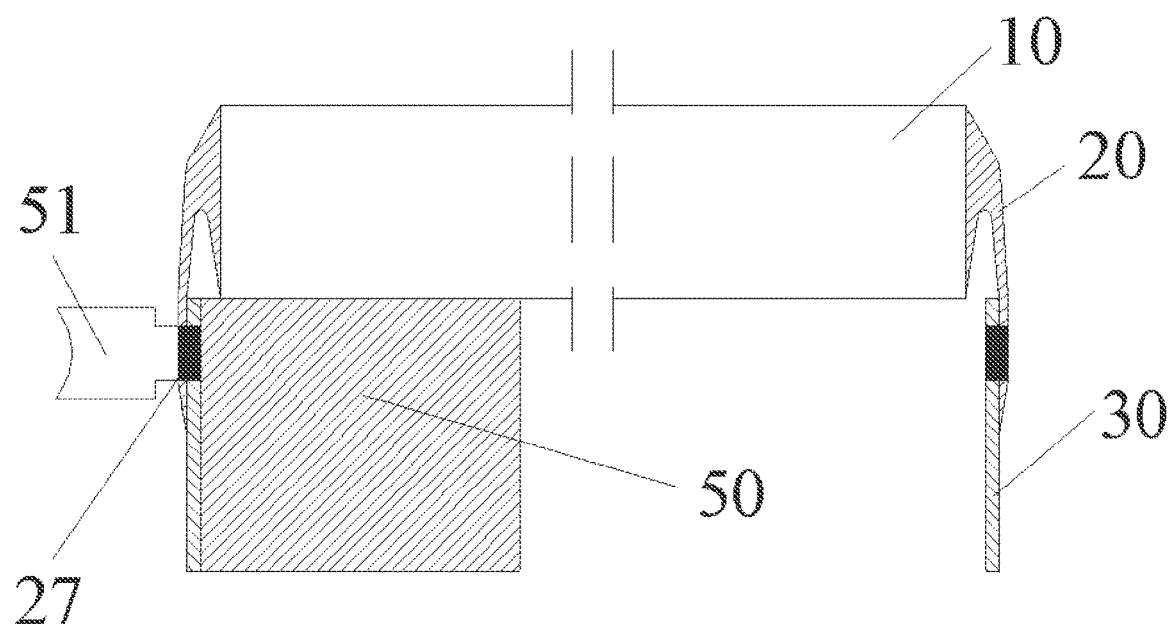
FIG. 6 is a structural diagram of a process of a battery manufacturing method according to an exemplary embodiment.

As shown in FIG. 6, the tab portion 20 and the connecting piece 30 are oppositely disposed. The welding seat 50 is disposed on one side of the tab portion 20 close to the main body portion 10. A welding head 51 is used to weld the tab portion 20 and the connecting piece 30 to form the structure shown in FIG. 7.

As shown in FIG. 9, the connecting piece 30 in FIG. 7 is pushed into the shaping groove 23. At this time, the tab portion 20 is bent. After the connecting piece 30 is inserted into the shaping groove 23, a recess portion 21 is formed. At this time, the bent tab portion 20 is pressed to form a depression 22, thereby completing the manufacture of a single cell.

It should be noted that after the welding of the tab portion 20 on one side of the main body portion 10 is completed, the steps are also implemented on the tab portion 20 extending out from the other side surface of the main body portion 10 and the other connecting piece 30. Two supporting plates are respectively disposed on two sides of the main body portion 10 and are connected through a cross beam 111 extending along the length direction of the main body portion 10.

In another embodiment when the welding seat 50 is adopted for support, that is, the supporting plate 112 adopts the welding seat 50, the bending step is implemented on two tab portions 20 respectively extending out from two side surfaces of the same side of two main body portions 10. Before or after the bending step is implemented, the first large surfaces of the two main body portions 10 are oppositely disposed. The supporting plate 112 corresponds to the two tab portions 20. In the welding step, the two tab portions 20 are welded onto the second section 32 of the same connecting piece 30.

Specifically, the battery manufacturing method includes the following.

As shown in FIG. 5, the tab portion 20 is bent to form the shaping groove 23.

Figure 10:
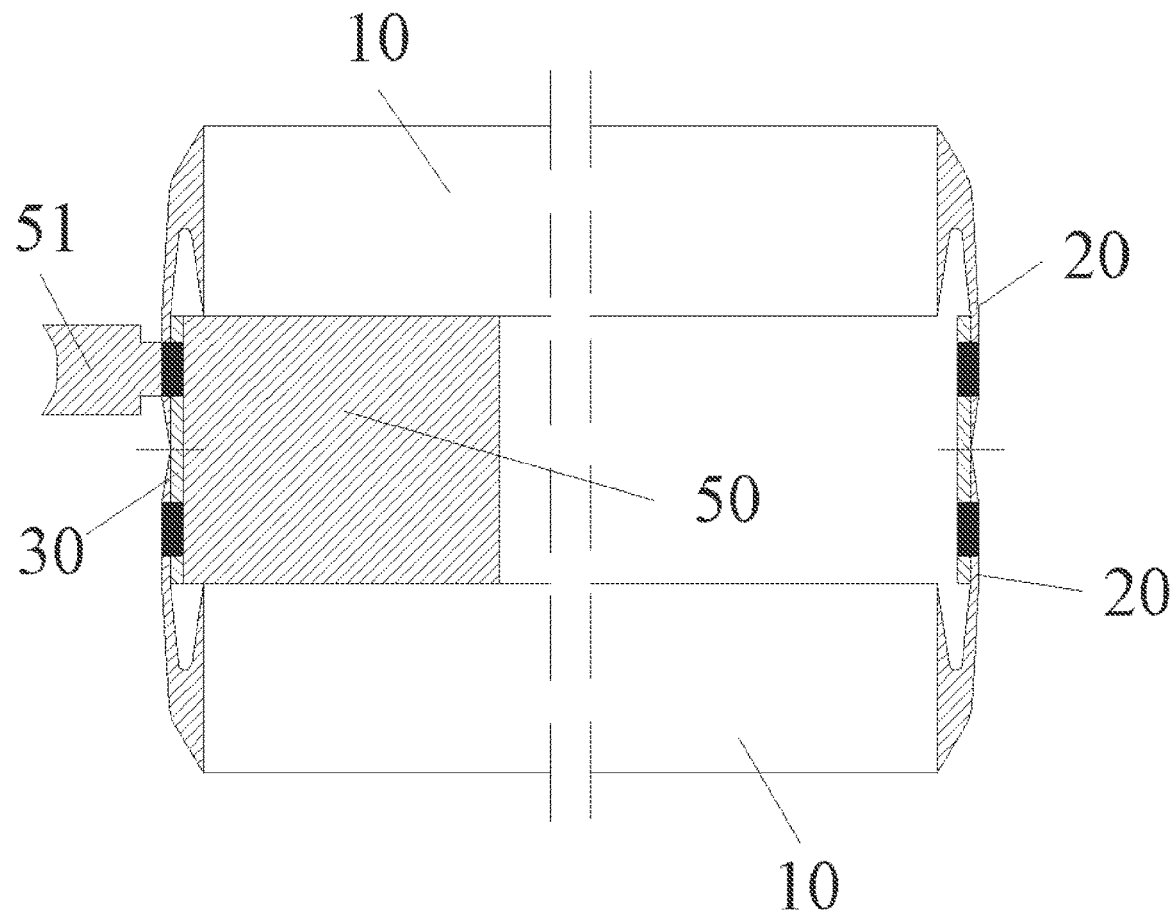
FIG. 10 is a structural diagram of a process of a battery manufacturing method according to another exemplary embodiment.

As shown in FIG. 10, the two main body portions 10 are disposed at intervals, and the welding seat 50 is disposed between the two main body portions 10. The welding head 51 is used to weld the tab portion 20 and the connecting piece 30.

As shown in FIG. 11, the two main body portions 10 disposed at intervals are brought close to each other. At this time, the tab portion 20 is bent, so that the two main body portions 10 are in contact. After the connecting piece 30 is inserted into the shaping groove 23, the recess portion 21 is formed. The bent tab portion 20 is pressed to form the depression 22, thereby completing the core assembly process of dual cells. FIG. 12 shows a structural diagram of the battery formed by the two main body portions 10 located inside the box 70.

It should be noted that the welding process of the foregoing embodiment is to perform welding after the two pairs of tab portions 20 are bent.

In an embodiment, the battery manufacturing method includes the following.

The two main body portions 10 are disposed at intervals, and the welding seat 50 is disposed between the two main body portions 10. The welding head 51 is used to weld the tab portion 20 and the connecting piece 30. The extension directions of the tab portion 20 and the main body portion 10 are consistent, that is, the tab portion 20 is not bent.

Two tab portions 20 welded to the connecting piece 30 are bent, and two unwelded tab portions 20 are bent (the step may also be performed before welding the tab portion 20 and the connecting piece 30), so as to form the shaping groove 23.

The welding seat 50 is disposed on one side of the two unwelded tab portions 20 after being bent. The welding head 51 is used to weld the tab portion 20 and the connecting piece 30.

The two main body portions 10 disposed at intervals are brought close to each other. At this time, the tab portion 20 is bent, so that the two main body portions 10 are in contact with each other. After the connecting piece 30 is inserted into the shaping groove 23, the recess portion 21 is formed. The bent tab portion 20 is pressed to form the depression 22, thereby completing the core assembly process of dual cells.

In the welding process of the embodiment, one pair of tab portions 20 is welded without bending and is bent after welding, and the other pair of tab portions 20 needs to be bent before welding.

It should be noted that after the welding of the tab portions 20 on one side and the connecting piece 30 is completed, the steps are also implemented on the two tab portions 20 respectively extending out from the two side surfaces of the other side of the two main body portions 10 and the other connecting piece 30. The two supporting plates 112 are respectively disposed on two sides of the two main body portions 10 and are connected through the cross beam 111 disposed between the first large surfaces of the two main body portions 10 and extending along the length direction of the two main body portions 10. Of course, the same also applies to the connection between one main body portion 10 and one connecting piece 30. After the welding of the tab portion 20 on one side of the main body portion 10 and one connecting piece 30 are completed, the welding of the tab portion 20 on the other side of the main body portion 10 and the other connecting piece 30 is completed.

It should be noted that when the supporting plate 112 is the welding seat 50, the supporting plate 112 and the cross beam 111 may integrally form the welding seat 50. That is, one welding seat 50 implements the support for the two tab portions 20 at two ends of the main body portion 10.

In an embodiment, in the welding step, the supporting plate 112 for welding is disposed to support the second section 32 of the connecting piece 30 and the portion of the tab portion 20 facing the side surface of the main body portion 10. The welding is performed from the direction toward the side surface of the main body portion 10. The supporting plate 112 is closer to the side surface of the main body portion 10 than the second section 32 of the connecting piece 30 and the portion of the tab portion 20 facing the side surface of the main body portion 10. That is, the connecting piece 30 is directly opposite to the side surface of the main body portion 10 for subsequent welding.

Figure 15:
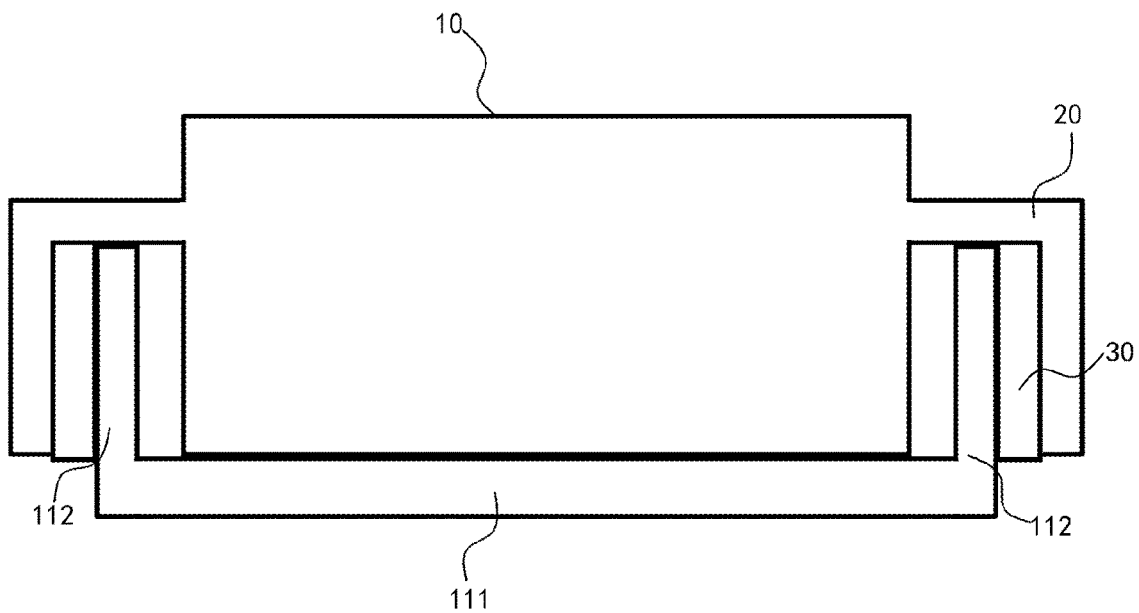
FIG. 15 is a structural diagram of an application of a supporting structure of a welding tool according to an exemplary embodiment.
Figure 16:
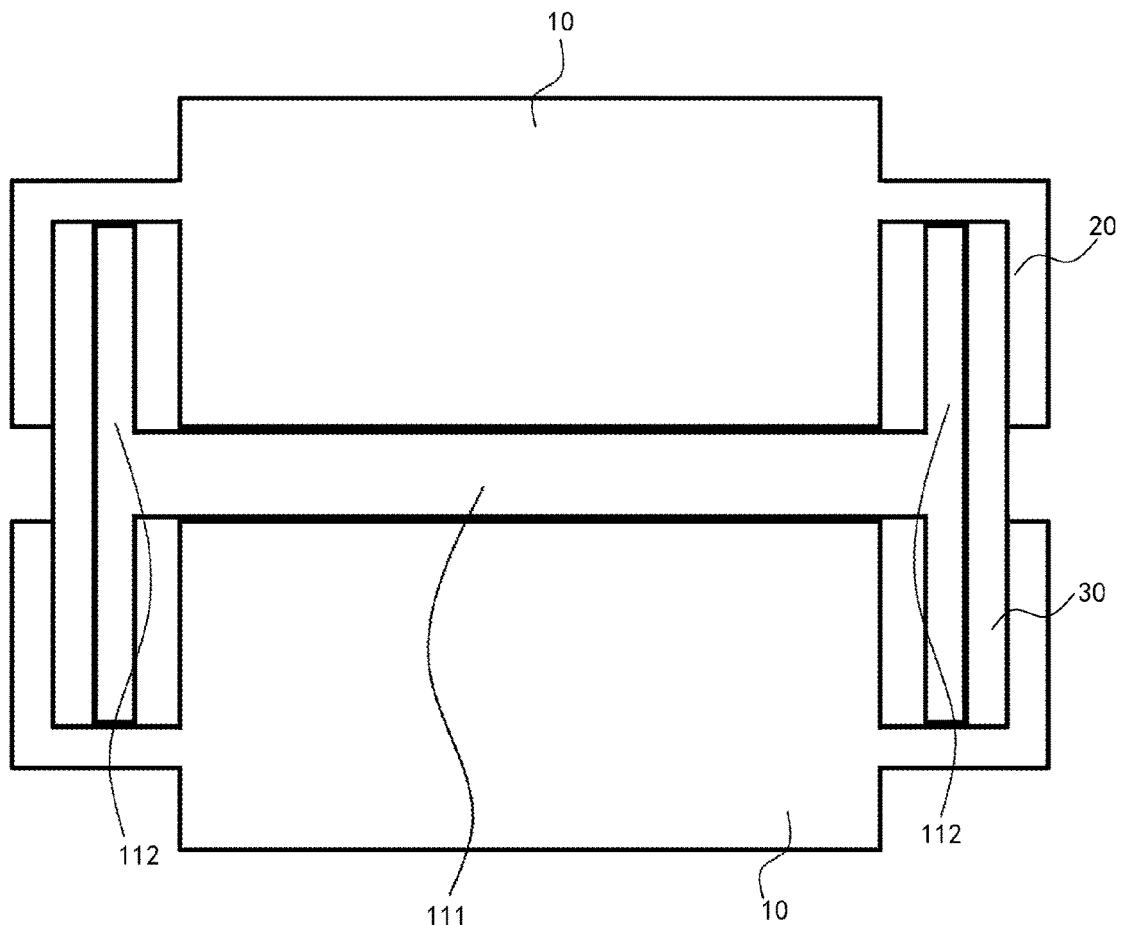
FIG. 16 is a structural diagram of an application of a supporting structure of a welding tool according to another exemplary embodiment.

Specifically, as shown in FIG. 15 and FIG. 16, the supporting plate 112 is clamped between the main body portion 10 and the connecting piece 30, and the welding is implemented through the outside of the tab portion 20, so as to implement the welding of the second section 32 and the tab portion 20. Compared with the above-mentioned welding implemented under the main body portion 10, the welding is implemented on the end side of the main body portion 10 in the present embodiment.

In an embodiment, the supporting plate 112 includes an extension portion extending out from one side of the first large surface of the main body portion 10 to one side of the other large surface. In the welding step, a portion of the tab portion 20 and the connecting piece 30 located between the two large surfaces of the main body portion 10 is welded. That is, it is ensured that the welding mark is formed in the middle portion of the tab portion 20 and the connecting piece 30 to improve the stability of the connection while reducing the amplitude of shaping after welding, which facilitates production and may greatly improve the production efficiency. The extension portion here mainly embodies that at least a portion of the supporting plate 112 can be located between the main body portion 10 and the connecting piece 30, so that the supporting plate 112 forms the support for the tab portion 20 and the connecting piece 30.

In an embodiment that adopts the supporting plate 112 for support, as shown in FIG. 15, two tab portions 20 on two sides of one main body portion 10 respectively correspond to one connecting piece 30. Through respectively supporting two supporting plates 112 on one side of the two connecting pieces 30, the respective welding of the two tab portions 20 and the two connecting pieces 30 is implemented.

It should be noted that the steps are also implemented on the tab portion 20 extending out from the other side surface of the main body portion 10 and the other connecting piece 30. The two supporting plates are respectively disposed on two sides of the main body portion 10 and are connected through the cross beam 111 extending along the length direction of the main body portion 10.

In another embodiment that adopts the supporting plate 112 for support, the bending step is implemented on two tab portions 20 respectively extending out from two side surfaces of the same side of two main body portions 10. Before or after the bending step is implemented, the first large surfaces of the two main body portions 10 are oppositely disposed. The supporting plate 112 corresponds to the two tab portions 20. In the welding step, the two tab portions 20 are both welded onto the second section 32 of the same connecting piece 30.

Specifically, as shown in FIG. 16, the two tab portions 20 on the same side of the two main body portions 10 share one connecting piece 30. At this time, one supporting plate 112 simultaneously supports the two tab portions 20 on the same side of the two main body portions 10.

It should be noted that after the welding of the tab portions 20 on one side and the connecting piece 30 is completed, the steps are also implemented on the two tab portions 20 respectively extending out from the two side surfaces of the other two main body portions 10 and the other connecting piece 30. The two supporting plates 112 are respectively disposed on two sides of the two main body portions 10 and are connected through the cross beam 111 disposed between the first large surfaces of the two main body portions 10 and extending along the length direction of the two main body portions 10. The cross beam 111 implements the limiting effect on the two supporting plates 112 to ensure that the two supporting plates 112 are reliably positioned at fixed positions, so as to ensure reliable support for the two connecting pieces 30. At this time, the cross beam 111 is clamped between the two main body portions 10.

It should be noted that when the two supporting plates 112 are connected through one cross beam 111, the tab portions 20 on two sides of the main body portion 10 may be welded at the same time, thereby improving the welding efficiency. Of course, it is not ruled out that the tab portions 20 on two sides of the main body portion 10 are welded in sequence, which may be selected according to implementation requirements and is not limited thereto.

In an embodiment, the battery manufacturing method is configured to manufacture the above-mentioned battery.

The welding described in the disclosure includes, but is not limited to, laser welding and ultrasonic welding.

The supporting plate 112 for welding is disposed to support the second section 32 of the connecting piece 30 and the portion of the tab portion 20 facing the side surface of the main body portion 10. The welding is performed from the direction toward the side surface of the main body portion 10. The welding tools adopted include the two supporting plates 112 and the cross beam 111. The cross beam 111 implements the connection of the two supporting plates 112. The two main body portions 10 clamp the cross beam 111 in the middle to ensure that reliable support of the two supporting plates 112 on the two connecting pieces 30.

Further, the welding tools also include two pressing plates 120 respectively corresponding to the two supporting plates 112. The pressing plate 120 and the supporting plate 112 are configured to clamp the connecting piece 30 and the portion of the tab portion 20 facing the side surface of the main body portion 10 during welding. An avoidance area 121 for avoiding welding energy is disposed on the pressing plate 120, so that the welding energy during welding acts on the clamped portion of the connecting piece 30 and the tab portion 20.

Specifically, please refer to FIG. 15 to FIG. 18. The welding tools include a supporting structure 110; and the pressing plate 120, spaced apart from the supporting structure 110 and configured to clamp the connecting piece 30 and the tab portion 20. The avoidance area 121 for avoiding welding energy is disposed on the pressing plate 120, so that the welding energy is used on the connecting piece 30 and the tab portion 20. The supporting structure 110 includes the supporting plate 112.

The connecting piece 30 and the tab portion 20 are compacted through the pressing plate 120 and the supporting structure 110, that is, the connecting piece 30 and the tab portion 20 are in reliable contact, so that reliable welding between the connecting piece 30 and the tab portion 20 is ensured during welding.

It should be noted that the pressing plate 120 and the supporting structure 110 clamp the connecting piece 30 and the tab portion 20. That is, it can be understood that the supporting structure 110 supports the connecting piece 30, and the pressing plate 120 presses the tab portion 20 onto the connecting piece 30 to ensure that the connecting piece 30 and the tab portion 20 are in reliable contact. Alternatively, the supporting structure 110 supports the tab portion 20, and the pressing plate 120 presses the connecting piece 30 onto the tab portion 20. The positional relationship between the connecting piece 30 and the tab portion 20 is not limited here and is determined according to the specific structure. That is, the connecting piece 30 may directly correspond to a welding gun of a welding mechanism, or the tab portion 20 may directly correspond to the welding gun.

The avoidance area 121 corresponds to the area to be welded between the connecting piece 30 and the tab portion 20 to ensure that the welding energy emitted by the welding mechanism can directly act on the connecting piece 30 and the tab portion 20, thereby ensuring the welding quality.

In an embodiment, there may be multiple avoidance areas 121, and the multiple avoidance areas 121 are disposed at intervals to form multiple welding portions on the connecting piece 30 and the tab portion 20, so as to ensure the stability of welding. In the embodiment, there may be two avoidance areas 121, and the two avoidance areas 121 are both rectangular through holes.

In an embodiment, the pressing plates 120 are disposed in pairs. A pair of pressing plates 120 is respectively located on two sides of the supporting structure 110. The two pressing plates 120 and the supporting structure 110 may respectively compact two pairs of connecting pieces 30 and tab portions 20. Alternatively, the arrangement of the two pressing plates 120 may also implement the compacting of one pair of connecting plate 30 and tab portion 20, that is, the structure corresponding to the other side of the pressing plate 120 is not considered, and only serves as support for the other side of the supporting structure 110.

In an embodiment, as shown in FIG. 15 to FIG. 18, the supporting structure 110 includes the cross beam 111; and two supporting plates 112, respectively connected with two ends of the cross beam 111 to respectively correspond to two pressing plates 120, so as to ensure that the supporting plate 112 and the pressing plate 120 compact the piece 30 and the tab portion 20.

It should be noted that the two supporting plates 112 and the two pressing plates 120 are oppositely disposed. The two pairs of supporting plates 112 and pressing plates 120 may correspond to the two pairs of connecting pieces 30 and tab portions 20. Alternatively, one pair of the two pairs of supporting plates 112 and pressing plates 120 is configured to compact the connecting piece 30 and the tab portion 20, while the other pair is only configured to implement the support.

In an embodiment, as shown in FIG. 15, the end portions of the two supporting plates 112 are respectively connected with the two ends of the cross beam 111. The two supporting plates 112 are oppositely disposed and are both located on the same side of the cross beam 111. That is, the two supporting plates 112 are respectively a first supporting plate and a second supporting plate. One end of the first supporting plate is connected with one end of the cross beam 111, and one end of the second supporting plate is connected with the other end of the cross beam 111. The first supporting plate and the second supporting plate are oppositely disposed and are located on the same side of the cross beam 111, so that the first supporting plate and the second supporting plate form a U-shaped structure with the cross beam 111. That is, the supporting structure 110 is configured to support the single main body portion 10.

Specifically, the main body portion 10 is located in the U-shaped structure, so that the connecting piece 30 and the tab portion 20 are located outside the supporting plate 112. The pressing plate 120 ensures that the connecting piece 30 and the tab portion 20 are in reliable contact. As shown in FIG. 15, the connecting piece 30 is in contact with the supporting plate 112, and the pressing plate 120 is configured to be pressed onto the tab portion 20.

In an embodiment, as shown in FIG. 16, the middle portions of the two supporting plates 112 are respectively connected with the cross beam 111. That is, the two supporting plates 112 are respectively the first supporting plate and the second supporting plate. The middle portion of the first supporting plate is connected with one end of the cross beam 111, and the middle portion of the second supporting plate is connected with the other end of the cross beam 111. The first supporting plate and the second supporting plate are oppositely disposed, so that the first supporting plate and the second supporting plate form an H-shaped structure with the cross beam 111. That is, the supporting structure 110 is configured to support the two main body portions 10.

Specifically, the two main body portions 10 are respectively located on the upper and lower sides of the cross beam 111, so that the connecting piece 30 and the tab portion 20 are located on the outside of the supporting plate 112. The pressing plate 120 ensures that the connecting piece 30 and the tab portion 20 are in reliable contact. As shown in FIG. 16, the connecting piece 30 is in contact with the supporting plate 112, and the pressing plate 120 is configured to be pressed onto the tab portion 20.

In an embodiment, the supporting plate 112 and the cross beam 111 are an integral structure, and the integral structure may be multiple independent parts fixedly connected after being formed. The integral structure may also be an integrally formed structure.

Figure 17:
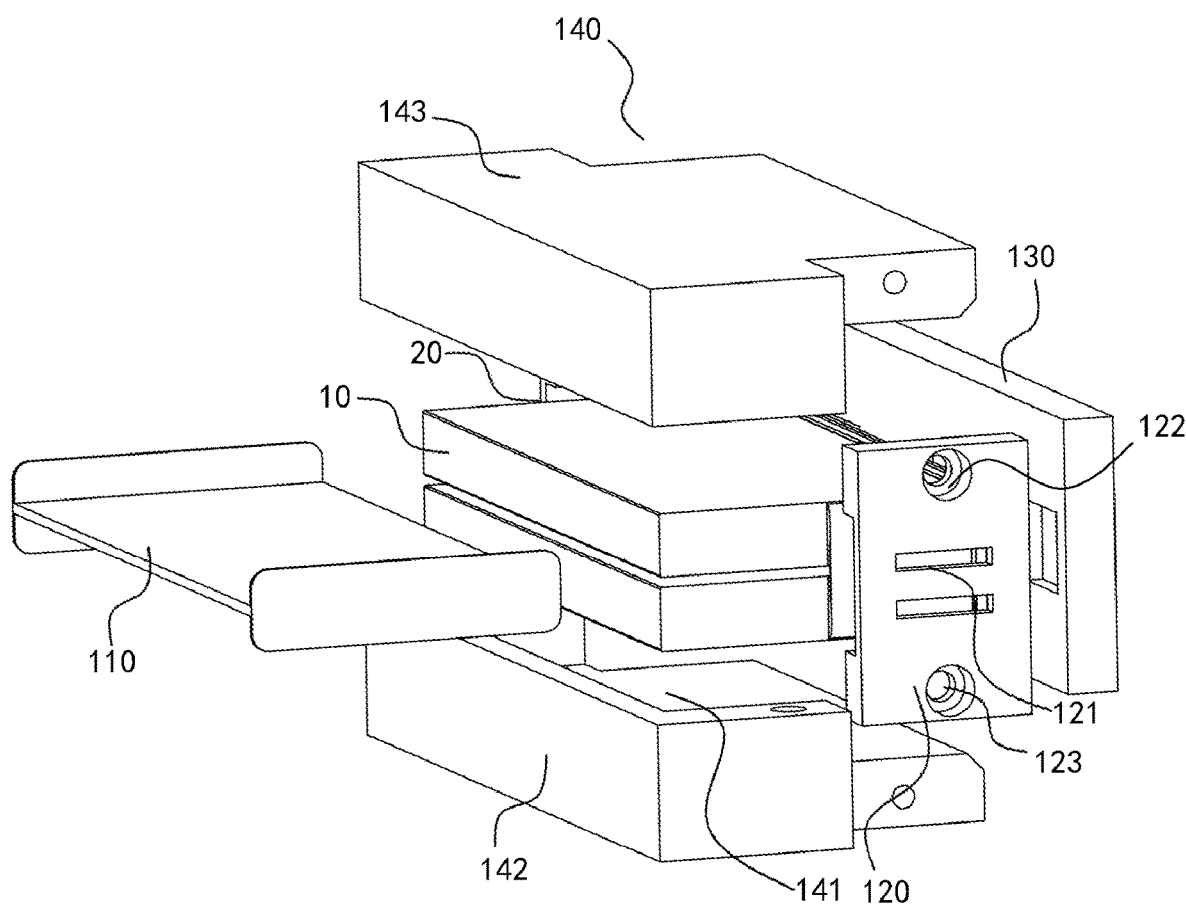
FIG. 17 is an exploded structural diagram of a first perspective of a welding tool according to an exemplary embodiment.
Figure 18:
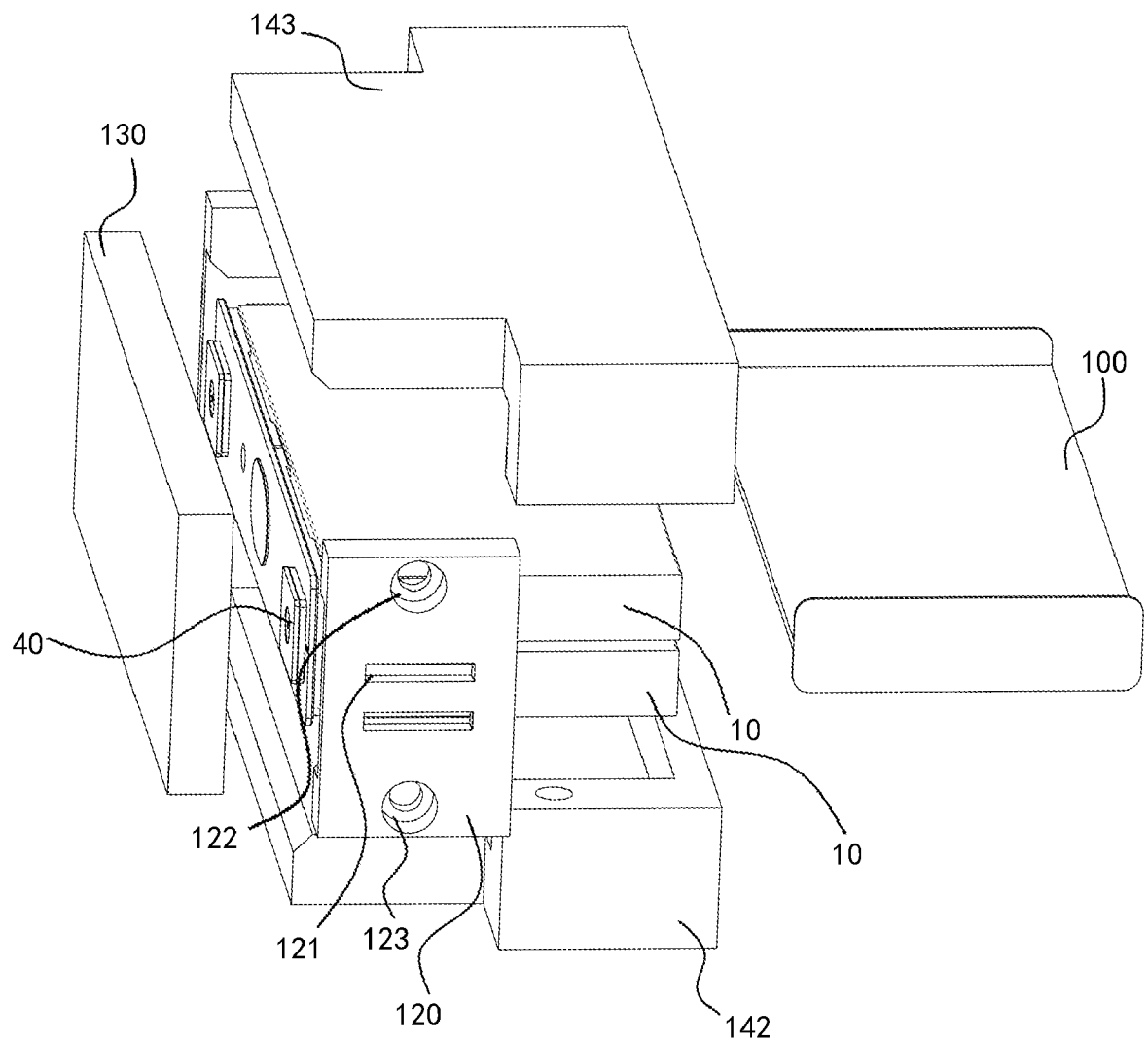
FIG. 18 is an exploded structural diagram of a second perspective of a welding tool according to an exemplary embodiment.

In an embodiment, the avoidance area 121 is a through hole or a gap. As shown in FIG. 17 and FIG. 18, the avoidance area 121 is a through hole, and there are multiple through holes. The gap refers to a circumferential non-enclosed space, that is, a space for avoiding welding energy may be cut out on the pressing plate 120.

In an embodiment, as shown in FIG. 17 and FIG. 18, the welding tools further include a positioning portion 130, configured to be spaced apart from the main body portion 10 to press the cover plate assembly 40 onto the main body portion 10, so as to ensure that the connecting piece 30 on the cover plate assembly 40 can be in a fixed position without positional change.

In an embodiment, the positioning portion 130 may be a plate-shaped structure directly in contact with the cover plate assembly 40 to ensure that the cover plate assembly 40 is in contact with the main body portion 10. Regarding the relationship between the positioning portion 130 and the pressing plate 120, after the positioning portion 130 is in contact with the main body portion 10, the positioning portion 130 and the pressing plate 120 are in a perpendicular relationship, that is, the positioning portion 130 is located on the top portion of the main body portion 10, and the pressing plate 120 is located on the end portion of the main body portion 10.

In an embodiment, as shown in FIG. 17 and FIG. 18, the welding tools further include a cell clamping assembly 140, having an accommodation space 141. The accommodation space 141 is configured to accommodate the main body portion 10. The pressing plate 120 is connected with the cell clamping assembly 140, that is, the pressing plate 120 can be fixed through the cell clamping assembly 140 to ensure that the connecting piece 30 and the tab portion 20 are compacted.

In an embodiment, as shown in FIG. 17 and FIG. 18, the cell clamping assembly 140 includes a bottom plate 142 and a top plate 143. The accommodation space 141 is formed between the bottom plate 142 and the top plate 143. The supporting structure 110 is located in the accommodation space 141. The pressing plate 120 is located outside the accommodation space 141. The pressing plate 120 is connected with at least one of the bottom plate 142 and the top plate 143.

Specifically, the bottom plate 142 and the top plate 143 are oppositely disposed, that is, the main body portion 10 is pressed between the bottom plate 142 and the top plate 143. The two ends of the bottom plate 142 and the top plate 143 are reserved with open spaces to ensure leakage of the connecting piece 30 and the tab portion 20. At this time, the two pressing plates 120 are connected onto the bottom plate 142 and/or the top plate 143 to implement the sealing of the two open spaces. At this time, the welding mechanism may implement the welding of the connecting piece 30 and the tab portion 20 through the avoidance area 121 on the pressing plate 120.

The top ends of the bottom plate 142 and the top plate 143 also have an open space. The open space ensures leakage of the cover plate assembly 40. The positioning portion 130 is configured to seal the open space, so that the entire accommodation space 141 is an enclosed structure except for the avoiding area 121 connected with the outside world to prevent the main body portion 10 from being contaminated by welding dust.

In an embodiment, the positioning portion 130 is sandwiched between the bottom plate 142 and the top plate 143. That is, the positioning portion 130 may not adopt an external connection structure and only rely on clamping force to implement fixation with the bottom plate 142 and the top plate 143.

In an embodiment, as shown in FIG. 17 and FIG. 18, a first positioning hole 122 and a second positioning hole 123 are disposed on the pressing plate 120. The first positioning hole 122 and the second positioning hole 123 are respectively configured for two positioning members to pass through. The two positioning members are respectively connected with the bottom plate 142 and the top plate 143. The pressing plate 120 implements the connection with the bottom plate 142 and the top plate 143 by the positioning members.

In an embodiment, the bottom plate 142 and the top plate 143 may be detachably connected to open or close the accommodation space 141, that is, to implement the installation and disassembly of the main body portion 10.

In an embodiment, the bottom plate 142 and the top plate 143 may be rotatably connected, that is, the top plate 143 is rotated relative to the bottom plate 142 to implement the opening and closing of the accommodation space 141.

In an embodiment, the bottom plate 142 and the top plate 143 may be directly connected, that is, the two may be connected through a positioning post and a positioning hole to clamp the main body portion 10 between the two. The top plate 143 may be directly removed when disassembling.

In an embodiment, the welding tool cooperates with the welding mechanism. The welding mechanism implements stable welding of the connecting piece 30 and the tab portion 20 through the avoidance area 121. The welding mechanism may be a laser welding mechanism or an ultrasonic welding mechanism. Of course, other types of welding mechanisms are not excluded, as long as stable welding of the connecting piece 30 and the tab portion 20 can be implemented.

On the basis of maximizing the utilization rate of the internal space of the battery, the battery and the manufacturing method thereof of the disclosure eliminate folding, tab cutting, and tab pre-welding to simplify the manufacturing process and reduce the manufacturing cost while simplifying the structure of the connecting piece to reduce cost. The simplification of the structure of the connecting piece reduces the internal space of the battery occupied by the connecting piece (in the length direction of the cell), reduces the manufacturing cost of the connecting piece, and increases the manufacturability of the connecting piece. The tab portion is directly welded to the connecting piece, and core assembly of two cells are performed through the shaping of the tab portion without affecting battery safety and subsequent processes. The cell reduces the space occupied by the connecting piece and the tab portion in the length direction of the cell, and improves the utilization rate of the internal space of the battery. The assembly and welding scheme of the connecting piece and the tab portion requires only welding, tab shaping, and core assembly processes without cutting the tab portion and folding the connecting piece, which prevents issues caused by similar processes.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A battery manufacturing method, comprising:
a bending step of bending a tab portion of two tab portions toward a first large surface of two opposite large surfaces of a main body portion of two main body portions of a battery, so that a portion of the tab portion faces a side surface of the main body portion, and the tab portion extends out from the side surface of the main body portion; and
a welding step of disposing a second section of a connecting piece on a surface of one side of the tab portion facing or facing away from the side surface of the main body portion and parallel to or almost parallel to the side surface of the main body portion, and welding the tab portion to the second section of the connecting piece, wherein the connecting piece is a plate-shaped object bent into a first section and the second section, and the first section is configured to be connected with a pole disposed on a top surface of the main body portion, wherein
in the welding step, a supporting plate for welding is disposed to support the second section of the connecting piece and the portion of the tab portion facing the side surface of the main body portion, welding is implemented from a direction toward the side surface of the main body portion, and the supporting plate is closer to the side surface of the main body portion than the second section of the connecting piece and the portion of the tab portion facing the side surface of the main body portion;
the bending step is implemented on the two tab portions respectively extending out from two side surfaces of a same side of the two main body portions, and the first large surfaces of the two main body portions are oppositely disposed before or after the bending step is implemented;
the supporting plate corresponds to the two tab portions; the steps are also implemented on two tab portions respectively extending out from two side surfaces of another side of the two main body portions and another connecting piece; and
the supporting plate is provided as two supporting plates, the two supporting plates are respectively disposed on two sides of the two main body portions and are connected through a cross beam disposed between the first large surfaces of the two main body portions and extending along a length direction of the two main body portions.

2. The battery manufacturing method according to claim 1, further comprising a shaping step, wherein
in the bending step, a portion of the tab portion exceeds the first large surface in a width direction of the main body portion;
in the welding step, the portion of the tab portion exceeding the first large surface is welded; and
in the shaping step, a portion between a welding mark of the tab portion and the side surface of the main body portion is stacked to reduce a size of the tab portion along a width and/or height direction of the main body portion.

3. The battery manufacturing method according to claim 1, wherein
the supporting plate comprises an extension portion extending out from one side of the first large surface of the main body portion to one side of another large surface, and in the welding step, welding is implemented on a portion of the tab portion and the connecting piece located between the two large surfaces of the main body portion.

4. The battery manufacturing method according to claim 3, wherein in the welding step, the two tab portions are both welded onto the second section of the connecting piece.

5. The battery manufacturing method according to claim 1, wherein welding tools used comprise the two supporting plates and the cross beam.

6. The battery manufacturing method according to claim 5, wherein the welding tools further comprise two pressing plates respectively corresponding to the two supporting plates;
the pressing plate and the supporting plate are configured to clamp the connecting piece and the portion of the tab portion facing the side surface of the main body portion during welding; and
an avoidance area for avoiding welding energy is disposed on the pressing plate, so that the welding energy during welding acts on a clamped portion of the connecting piece and the tab portion.

* * * * *